United States Patent
Pong et al.

(10) Patent No.: US 6,880,045 B2
(45) Date of Patent: Apr. 12, 2005

(54) MULTI-PROCESSOR COMPUTER SYSTEM WITH TRANSACTIONAL MEMORY

(75) Inventors: Fong Pong, Mountain View, CA (US); Lance Russell, Hollister, CA (US); Tung Nguyen, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 325 days.

(21) Appl. No.: 09/976,495

(22) Filed: Oct. 12, 2001

(65) Prior Publication Data

US 2002/0073071 A1 Jun. 13, 2002

Related U.S. Application Data

(62) Division of application No. 09/258,608, filed on Feb. 26, 1999, now Pat. No. 6,360,231.

(51) Int. Cl.[7] .............................................. G06F 13/00
(52) U.S. Cl. ..................................................... 711/135
(58) Field of Search ............................. 711/135; 710/52

(56) References Cited

U.S. PATENT DOCUMENTS 5,892,970 A * 4/1999 Hagersten ...................... 710/5
5,961,623 A * 10/1999 James et al. ................. 710/113

* cited by examiner

Primary Examiner—David L. Robertson

(57) ABSTRACT

A cache coherent distributed shared memory multi-processor computer system is provided which supports transactional memory semantics. A cache flushing engine and temporary buffer allow selective forced write-backs of dirty cache lines to the home memory. A flush can be performed from the updated cache to the temporary buffer and then to the home memory after confirmation of receipt or from the updated cache to the home memory directly with the temporary buffer holding the old data until confirmation that the home memory contains the update.

6 Claims, 2 Drawing Sheets

MULTI-PROCESSOR COMPUTER SYSTEM WITH TRANSACTIONAL MEMORY

CROSS-REFERENCE TO RELATED APPLICATIONS

This is a divisional of application Ser. No. 09/258,608 filed Feb. 26, 1999 now U.S. Pat. No. 6,360,231, which is hereby incorporated by reference herein.

The present application contains subject matter related to pending U.S. patent application Ser. No. 09/258,549 entitled "Cache Flushing Engine for Distributed Shared Memory Multi-processor Computer Systems" by F. Pong, L. Russell, and T. Nguyen. This application is assigned to Hewlett-Packard Corporation and is hereby incorporated by reference.

TECHNICAL FIELD

The present invention relates generally to multi-processor computer systems and more particularly to system control units.

BACKGROUND ART

High performance, multi-processor computer systems with a large number of microprocessors are built by interconnecting a number of node structures, each node containing a subset of the processors and memory in the system. While the memory in the system is distributed, several of these systems support a shared memory abstraction where all the memory in the system appears as a large memory common to all processors in the system. To support high-performance, these systems typically allow processors to maintain copies of memory data in their local caches. Since multiple processors can cache the same data, these systems must incorporate a cache coherence mechanism to keep the copies coherent.

In some cache-coherent systems, each memory block (typically a portion of memory tens of bytes in size) is assigned a "home node", which maintains all necessary global information for that memory block, manages the sharing of that memory block, and guarantees its coherence. The home node maintains a directory, which identifies the nodes that possess a copy of the memory block. When a node requires a copy of the memory block, it requests the memory block from its local, private cache. If the data is found, the memory access is resolved locally. Otherwise, a remote memory access is performed to the home node. The home node supplies the data from memory if its memory has the latest data. If another node has the latest copy of the data, the home node directs this node to forward the data to the requesting node. The data is then stored in the local cache of the requesting node.

In cache-coherent systems, multiple copies of the same memory block can exist in different nodes. These copies must be read-only and identical to the home memory copy. They are called "clean" copies in a "shared" state.

When a processor updates its local cache copy, it must ensure that all other copies are invalidated. Consequently, the processor has an 'exclusive" and "modified" data copy, which hold the most recent value of the data. The other copies of the memory block are "stale". The updating processor then becomes the "owner" of the memory block.

The home node employs a coherence protocol to ensure that when a node writes a new value to the memory block, all other nodes see this latest value. Coherence controllers implement this coherence functionality. First, they implement a coherence controller for each memory unit, which maintains coherence of all memory blocks in that memory unit. Second, the functionality of the coherence controller is integrated with the functionality of the System Control Unit (SCU) of the associated memory unit.

The SCU provides the control and the path for data movement for the following sources and destinations within the node: the processors within the node; the local (node) portion of the memory system; the network connecting all of the nodes of the multi-processor computer system; and the input/output (I/O) system of the local node.

However, the state-of-art cache-coherent shared-memory multiprocessor system designs do not have good support for data integrity. Consider that a process executes the following code:

```
LOCK
    update global data A;
    update global data B;
    update global data C;
UNLOCK
```

The above code can be simply considered as a "transaction". Execution of the transaction causes the local cache of the executing processor to have the most recent data values of locations A, B, and C and the home memory of locations A, B, and C to have stale data copies. Unfortunately, if the local node fails, it means that the most recent values of locations A, B, and C are lost. In the worst case, the new value of location A is reflected back to its home memory, and the new changes for B and C are lost. As a result, the global data structure is corrupted or partially updated with incomplete information.

Note that this problem of data integrity is not caused by the failure of resources, in this case the home memory which exports locations A, B, and C. Instead, the problem is due to the failure of nodes/processes which use the resources.

Under many situations, the software may demand the semantics of "transactional memory". In brief, a transaction performed on global data structures consists of a "request" phase, an "execution" phase and finally a "commit" phase. The new changes are considered globally complete and visible only after the transaction is committed. If any failure occurs before the transaction commits, the system state is rolled back to the state right before the transaction begins.

For the exemplified transaction, it is clear that the LOCK operation defines where the original system state is and where the request phase begins. The UNLOCK operation indicates where the update operations must commit. Specifically, before the LOCK is released, the home memory of A, B, and C is either completely updated with the new values, or is unchanged. Given this "All-or-None" semantics, all processes will observe either the original state before the LOCK, or the new state defined by the execution of the transaction.

Thus, a system has been long sought and long eluded those skilled in the art, which would provide an efficient implementation of transactional memory.

DISCLOSURE OF THE INVENTION

The present invention provides a cache coherent distributed shared memory multi-processor computer system which supports transactional memory semantics.

The present invention also provides a cache coherent distributed shared memory multi-processor computer system which supports transactional memory semantics with a cache flushing engine.

The present invention further provides a cache coherent distributed shared memory multi-processor computer system which allows programmers to selective force write-backs of dirty cache lines to the home memory.

The above and additional advantages of the present invention will become apparent to those skilled in the art from a reading of the following detailed description when taken in conjunction with the accompanying drawings.

BEST MODES FOR CARRYING OUT THE INVENTION

Figure 1:
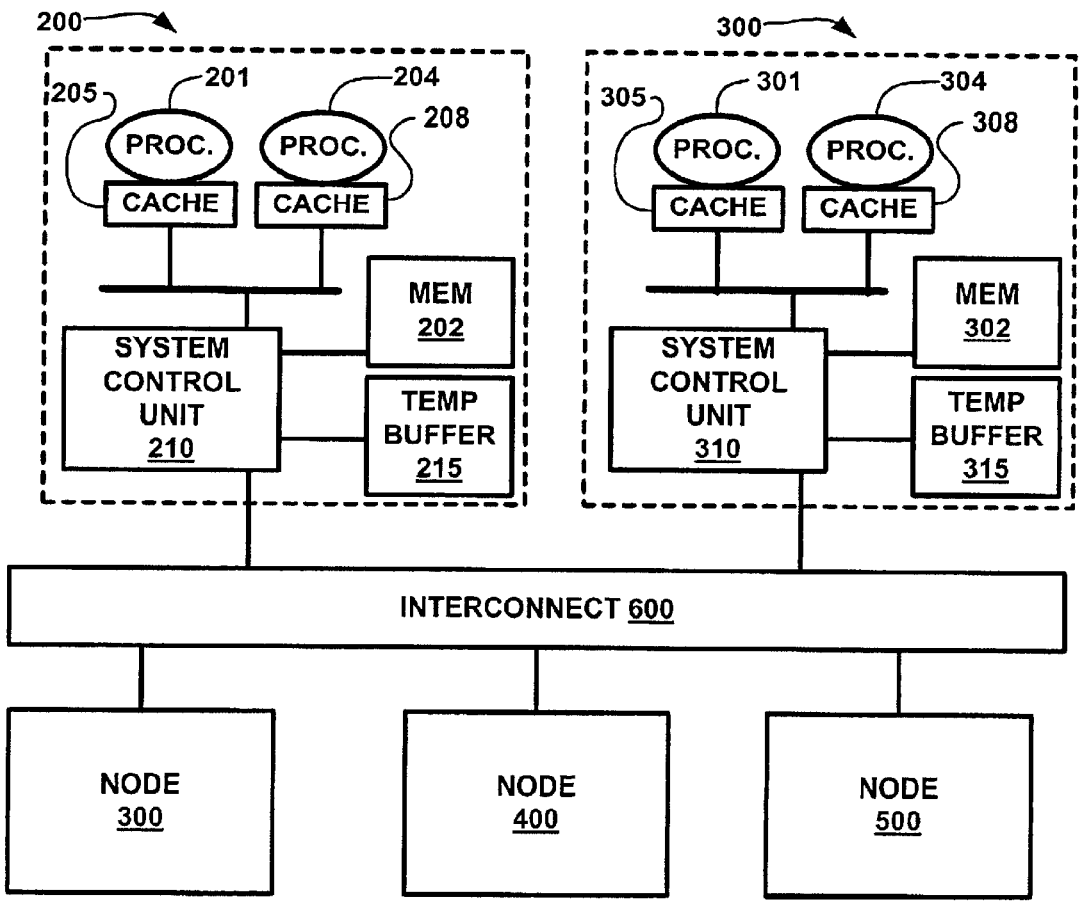
FIG. 1 is a cache coherent Distributed Shared Memory (DSM) multi-processor computer system according to the present invention.

Referring now to FIG. 1, therein is shown a cache coherent Distributed Shared Memory (ccDSM) multi-processor computer system 100. It should be understood that the system shown is for illustrative purposes only since the present invention is applicable to all architecture designs with caches. The multi-processor computer system 100 has a plurality of nodes 200, 300, 400, 500, and 600. The nodes 200, etc. are connected to an interconnect 700, which is part of an interconnection network which includes crossbar switches and links as are well known to those skilled in the art.

Each node contains a plurality of processors and caches. For example, the node 200 contains processors 201 through 204 (with only the first and last processors shown) and respective caches 205 through 208 (with only the first and last caches shown). The caches are connected to a System Control Unit (SCU) 210. The SCU 210 is connected to a memory 212 and a temporary buffer 215. The SCU 210 provides the control and the path for data movement for various sources and destinations within the node 200. The sources and destinations include: the processors 201 through 204 within the node; the local node memory 212; the interconnect 700; and the input/output (I/O) system of the local node (not shown). The SCU 210 further contains a cache flushing engine (CFE) 220, shown in FIG. 2.

Similarly, the node 300 contains processors 301 through 304 (with only the first and last processors shown) and respective caches 305 through 308 (with only the first and last processors shown). The caches are connected to a System Control Unit (SCU) 310. The SCU 310 is connected to a memory 312 and a temporary buffer 315. The SCU 310 provides the control and the path for data movement for various sources and destinations within the node 300.

The other nodes 400, 500, etc. are the same as the nodes 200 and 300.

Figure 2:
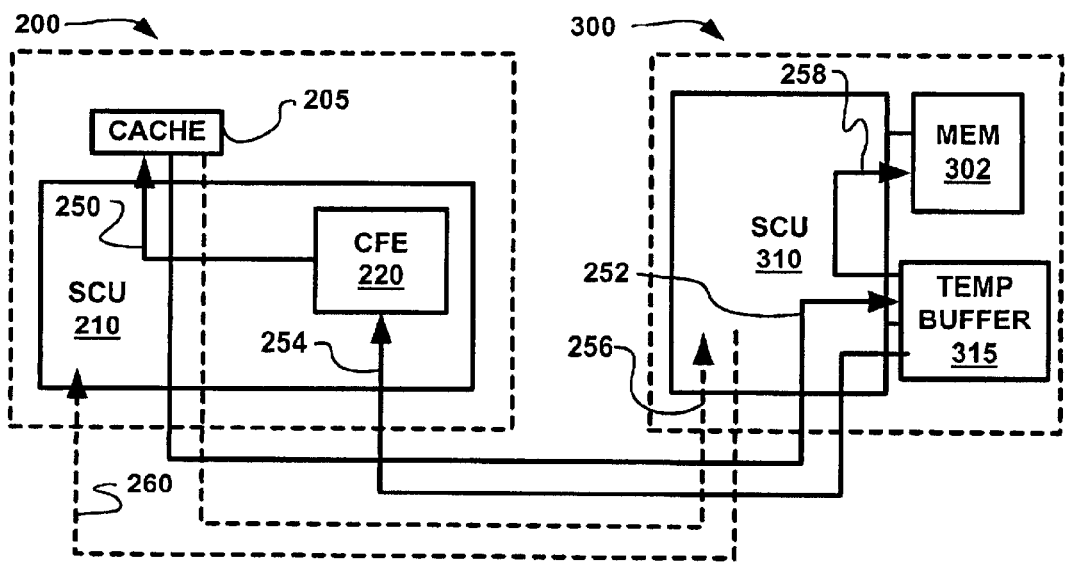
FIG. 2 is a functional block diagram of the operational components of the transactional memory according to the present invention.

Referring now to FIG. 2, therein is shown a functional block diagram of the operational components of the transactional memory according to the present invention. Herein, the node 200 is designated as a requesting node and the node 300 is designated as a home node. Initially, the requesting and home nodes have the same specified values in memory locations A, B, and C.

After an update, it is possible that the local cache of the requesting node, such as cache 205, may have the most recent values of location A, B, and C inputted by the processor 201. The home node then has stale data copies in its home memory 312. By issuing a "flush A, B, C" command as indicated by arrow 250, the CFE 220 will force, or "flush", the local cache 205 to write back the new values for locations A, B, and C to the temporary buffer 315 in the home node. The write back will be along "flush_req A, B, and C" arrow 252 from the cache 205 through the SCU 210 and the SCU 310 to the temporary buffer 315.

After the new values are written into the temporary buffer 315, the home node, or node 300, acknowledges with an "ack" signal back to the requesting node, node 200, as indicated by arrow 254 that all the new values have been successfully captured. Upon receiving the acknowledgement, the receiving node will issue a "request-to-commit" request as indicated by arrow 256. This will cause the home node SCU 310 to copy the new values from the temporary buffer 315 to the actual memory locations for A, B, and C in the memory 312.

Finally, the home node SCU 310 acknowledges with a "commit" message along arrow 260 to indicate that the transaction has been completed.

The software is developed with semantics of transactional memory so the code is:

```
LOCK
    update A, B, and C;
    flush A, B, C;
    sync;
UNLOCK
```

Figure 3:
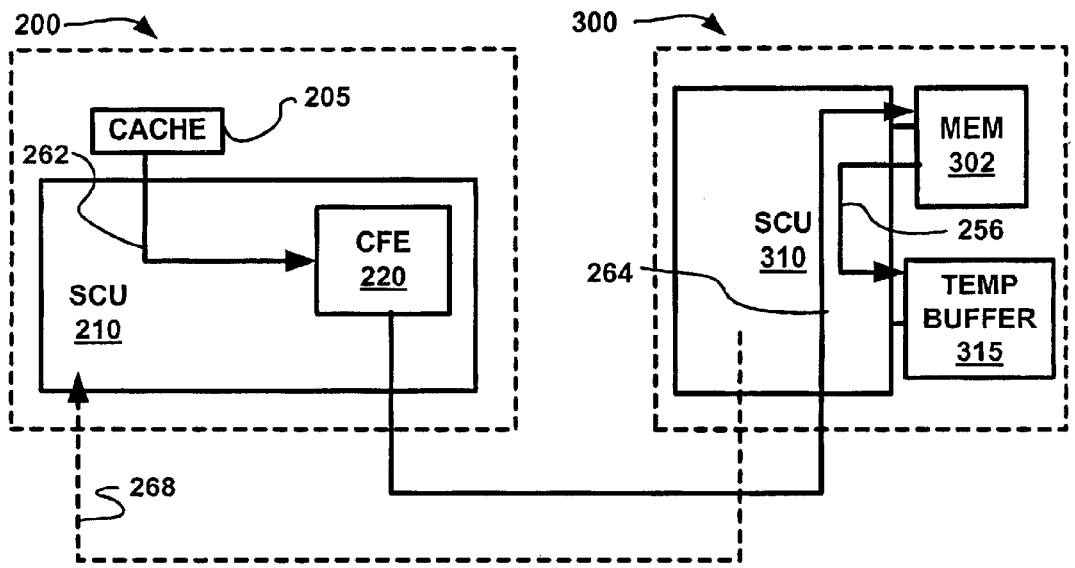
FIG. 3 is the functional block diagram of the operational components of the transactional memory in the backup operation in an alternate mode of the present invention.

Referring now to FIG. 3, therein is shown the functional block diagram of the operational components of the transactional memory in the backup operation in an alternate mode of the present invention. The architecture is the same as shown in FIG. 2 and the components have the same numbers.

After an update, the local cache of the requesting node, such as cache 205, has the most recent values of location A, B, and C. The CFE 220 receives a "backup A, B, C" instruction 262 and records the are potentially to be updated and flushed. The CFE 220 then sends a backup required instruction as indicated by "backup_req A, B, C" arrow 264 to home memory 312 in the home node SCU 310. The old values of the affected memory locations of the home memory 312 are then copied into the temporary buffer 315 as indicated by arrow 256 to prevent their loss in case of a failure before the transaction is completed. The SCU 310 then sends an acknowledge that the backup is complete as indicated by "ack" arrow 268.

Figure 4:
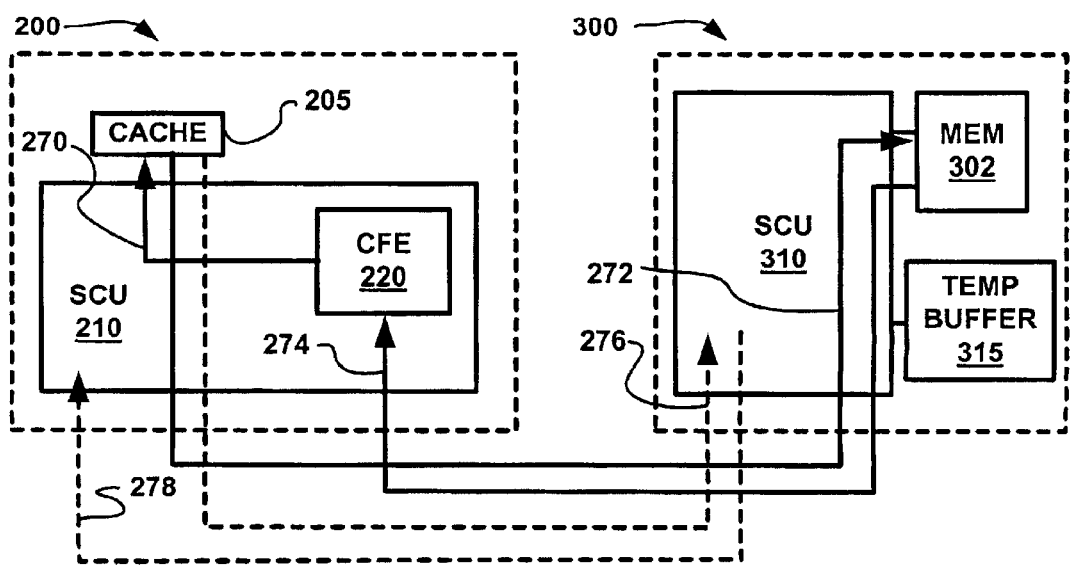
FIG. 4 is a functional block diagram of the operational components of the transactional memory in the flushing operation in the alternate mode of the present invention.

Referring now to FIG. 4, therein is shown the functional block diagram of the operational components of the transactional memory in the flushing operation of an alternate mode of the present invention.

After the backup operations of FIG. 3, the local cache 205 in the requesting node, node 200, will have the most recent values of locations A, B, and C. By issuing a "flush and synchronize" command as indicated by arrow 270, the CFE 220 forces the local cache 205 to write back the new value of A, B, and C as indicated by "flush req A, B, and C" arrow 272 to the home node memory 312.

After the new values are written into the home node memory 312, the home node 300, acknowledges with an "ack" signal as indicated by arrow 274 that all the new values have been successfully captured. Upon receiving the acknowledgement, the receiving node will issue a "request-to-commit" request as indicated by arrow 276. Finally, the home node SCU 310 acknowledges with a "commit" message along arrow 278 to indicate that the transaction has been completed.

If the transaction fails, the SRU 310 will retrieve the original values from the temporary buffer 315 and place them back in the memory 312.

The software is developed with semantics of transactional memory so the code is:

```
LOCK
    Backup A, B, and C;
    update A, B, and C;
    flush&sync;
UNLOCK
```

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A multi-processor computer system comprising:
   a plurality of processors;
   a plurality of caches, each of said plurality of caches operatively connected to one of said plurality of processors;
   a first system control unit operatively associated with one of said plurality of processors and operatively connected to one of said plurality of caches, said system control unit having a cache flushing engine operatively connected to said one of said plurality of caches;
   a second system control unit operatively associated with said first system control unit and operatively connected to said cache flushing engine;
   a memory operatively connected to said second system control unit; and
   said first system control unit responsive to an update of said one of said plurality of caches operatively connected therewith to flush said update to said second system control unit and assure said update is entered into said memory.

2. The multi-processor computer system as claimed in claim 1 including:
   a temporary buffer operatively connected through said second system control unit to said memory and to said one of said plurality of caches;
   said temporary buffer for containing said update flushed from said one of said plurality of caches; and
   said temporary buffer for transferring said update to said memory.

3. The multi-processor computer system as claimed in claim 1 including:
   a temporary buffer operatively connected through said second system control unit to said memory and to said one of said plurality of caches;
   said memory for receiving said update; and
   said temporary buffer for containing data from said memory when said memory receives said update.

4. The multi-processor computer system as claimed in claim 1 including:
   a memory operatively connected to said first system control unit;
   a temporary buffer operatively connected to said first system control unit;
   a temporary buffer operatively connected through said second system control unit to said memory and to said one of said plurality of caches;
   said second system control unit operatively connected to another of said plurality of caches;
   said second control unit having a cache flushing engine operatively connected to said another of said plurality of caches and operatively connected to said first control unit.

5. The multi-processor computer system as claimed in claim 1 including:
   a temporary buffer operatively connected through said second system control unit to said memory and to said one of said plurality of caches;
   said cache flushing engine is operatively connected through said second system control unit to said temporary buffer.

6. The multi-processor computer system as claimed in claim 1 including:
   a temporary buffer operatively connected through said second system control unit to said memory and to said one of said plurality of caches;
   said cache flushing engine is operatively connected through said second system control unit to said memory and said one of said plurality of caches is connected to said memory.

\* \* \* \* \*